US009593181B2

(12) United States Patent
Sato et al.

(10) Patent No.: US 9,593,181 B2
(45) Date of Patent: *Mar. 14, 2017

(54) RUBBER COMPOSITION FOR TIRES, AND PNEUMATIC TIRE USING SAME

(71) Applicant: The Yokohama Rubber Co., LTD., Minato-ku, Tokyo (JP)

(72) Inventors: Masaki Sato, Hiratsuka (JP); Satoshi Mihara, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/770,458

(22) PCT Filed: Feb. 25, 2014

(86) PCT No.: PCT/JP2014/054584
§ 371 (c)(1),
(2) Date: Aug. 25, 2015

(87) PCT Pub. No.: WO2014/129662
PCT Pub. Date: Aug. 28, 2014

(65) Prior Publication Data
US 2016/0002371 A1 Jan. 7, 2016

(30) Foreign Application Priority Data
Feb. 25, 2013 (JP) ................. 2013-035014

(51) Int. Cl.
| C08L 21/00 | (2006.01) |
| C08F 36/04 | (2006.01) |
| B60C 1/00 | (2006.01) |
| C08L 9/00 | (2006.01) |

(52) U.S. Cl.
CPC ............ *C08F 36/04* (2013.01); *B60C 1/0016* (2013.04); *C08L 9/00* (2013.01); *C08L 21/00* (2013.01)

(58) Field of Classification Search
CPC .. C08L 21/00; C08L 9/00; C08L 83/04; C08L 83/08; B60C 1/0016; C08F 36/04; C08K 5/548; C08K 5/40; C08K 3/36
See application file for complete search history.

(56) References Cited

U.S. PATENT DOCUMENTS

| 6,331,605 B1 | 12/2001 | Lunginsland et al. |
| 6,608,145 B1 | 8/2003 | Lin et al. |
| 8,524,823 B2 | 9/2013 | Guy et al. |
| 2003/0088034 A1 | 5/2003 | Luginsland et al. |
| 2003/0109614 A1 | 6/2003 | Luginsland et al. |
| 2006/0217473 A1 | 9/2006 | Hergenrother et al. |
| 2008/0033103 A1 | 2/2008 | Kameda et al. |
| 2009/0215948 A1 | 8/2009 | Guy et al. |
| 2011/0301280 A1 | 12/2011 | Kushida |
| 2013/0030097 A1* | 1/2013 | Salgues et al. ........ B60C 1/0016 524/186 |
| 2013/0331498 A1* | 12/2013 | Miyazaki .............. B60C 1/0016 524/493 |
| 2014/0005431 A1 | 1/2014 | Hirokami et al. |
| 2014/0213708 A1 | 7/2014 | Kushida |
| 2016/0009843 A1* | 1/2016 | Sato et al. ................ C08L 9/00 525/236 |
| 2016/0024286 A1* | 1/2016 | Sato et al. ................ B60C 1/00 524/526 |

FOREIGN PATENT DOCUMENTS

| EP | 1 788 020 | 5/2007 |
| FR | 2 886 308 | 12/2006 |
| JP | H10-0273559 | 10/1998 |
| JP | 2000-038395 | 2/2000 |
| JP | 2001-192454 | 7/2001 |
| JP | 2003-113243 | 4/2003 |
| JP | 2004-511598 | 4/2004 |
| JP | 2008-537740 | 9/2008 |
| JP | 2011-190450 | 9/2011 |
| JP | 2011/252124 | 12/2011 |
| JP | 2012-097257 | 5/2012 |
| JP | 2014-028797 | 2/2014 |
| WO | WO 01/96442 | 12/2001 |
| WO | WO 02/31034 | 4/2002 |
| WO | WO 2004 056918 | 7/2004 |
| WO | WO 2006/028254 | 3/2006 |
| WO | WO 2006/102518 | 9/2006 |
| WO | WO 2013/031488 | 3/2013 |
| WO | WO 2014/002750 | 1/2014 |
| WO | WO 2014/034673 | 3/2014 |

OTHER PUBLICATIONS

International Search Report for International Application No. PCT/JP2014/054584 dated Jun. 17, 2014, 4 pages, Japan.
Chenchy J. Lin, William L. Hergenrother, Ashley S. Hilton, Reduction of Volatile Organic Compound Emission. II., Use of Alkoxy-Modified Silsesquioxane for Compounding, Silica-Filled Rubbers, Journal of Applied Polymer Science, Aug. 12, 2008, pp. 655-664, vol. 115, Wiley Periodicals, Inc., Akron, Ohio, United States.

* cited by examiner

*Primary Examiner* — Nathan M Nutter
(74) *Attorney, Agent, or Firm* — Thorpe North & Western

(57) ABSTRACT

Provided is a rubber composition for a tire, comprising: diene rubber contained in a quantity of 100 parts by mass; silica contained in a quantity of 60 to 200 parts by mass; polysiloxanes represented by the average composition formula of Formula (1): $(A)_a(B)_b(C)_c(D)_d(R^1)_e SiO_{(4-2a-b-c-d-e)/2}$ contained in a quantity from 1 to 20 mass % relative to the quantity of silica; and a thiuram disulfide vulcanization accelerator contained in a quantity from 0.05 to 3.0 parts by mass.

9 Claims, 1 Drawing Sheet

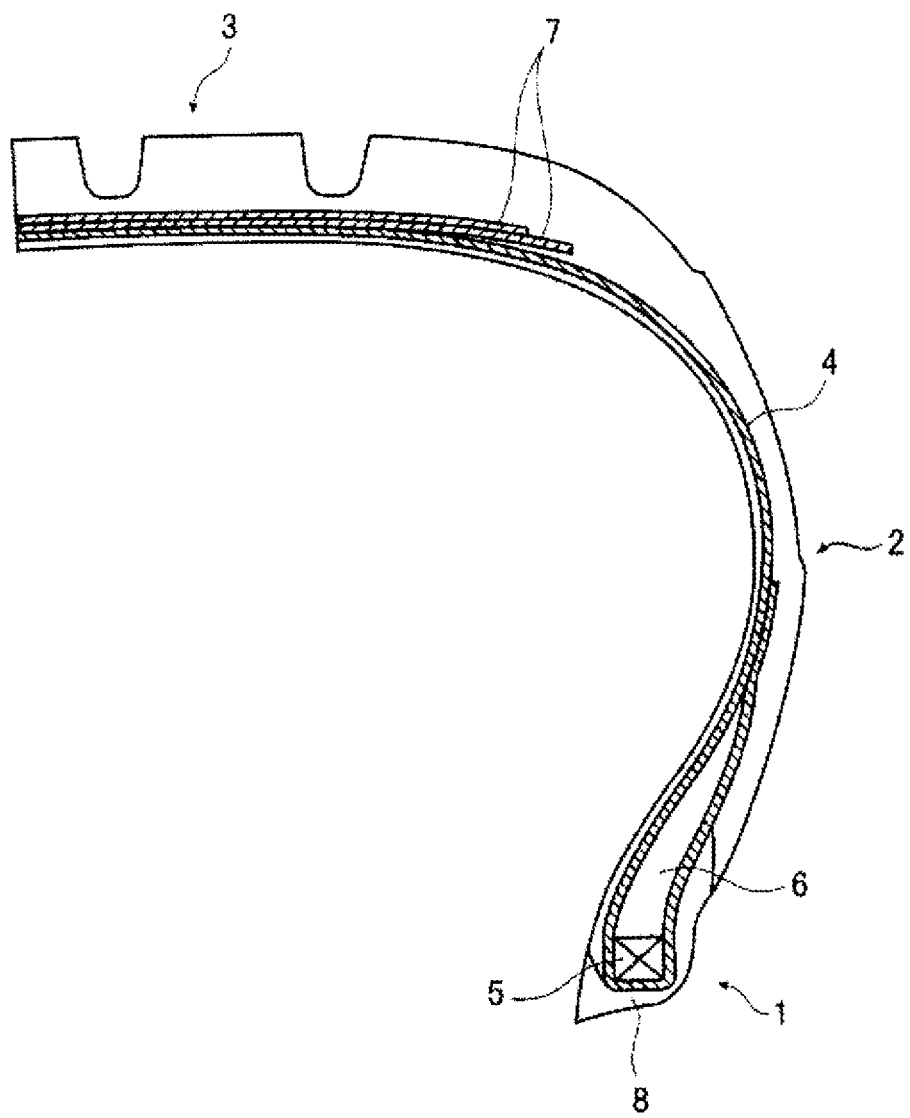

RUBBER COMPOSITION FOR TIRES, AND PNEUMATIC TIRE USING SAME

TECHNICAL FIELD

The present technology relates to a rubber composition for a tire and a pneumatic tire using the same.

BACKGROUND

Conventionally, in tires used in vehicles and the like, improved wet performance (wet grip performance) has been demanded from the perspective of safety while travelling, and reduced rolling resistance has been demanded from the perspective of fuel efficiency. Blending silica in the rubber component constituting the tread portion of a tire is a known method for responding to this problem, but silica has low affinity with rubber components, and the cohesiveness of silica components is high, so even if silica is simply added to the rubber component, the silica is not dispersed, which leads to the problem that the effect of reducing the rolling resistance or the effect of improving the wet performance cannot be sufficiently achieved.

A known method for responding to this problem is blending a mercaptosilane (a silane coupling agent having a mercapto group) capable of reacting with the silica in a rubber composition containing silica, or the like.

As a technique to improve silica dispersibility and wear resistance, the present inventors have proposed the use of a silane coupling agent having a mercapto group or sulfide group and a thiuram disulfide vulcanization accelerator in a rubber composition containing silica (Japanese Unexamined Patent Application Publication No. 2011-190450A).

With conventional rubber compositions containing mercaptosilanes, however, crosslinking (rubber scorch) and the like sometimes occurred at the storage stage or at a stage prior to the vulcanization process, and there was room for improvement from the perspective of processability of the rubber (for example, improving scorch resistance, and improving the balance of scorch resistance and time until vulcanization is complete (acceleration of vulcanization; similarly hereinafter)).

Additionally, even further improvement in wet performance and low rolling resistance has come to be demanded recently.

Additionally, in rubber compositions containing the thiuram disulfide vulcanization accelerator used in the rubber composition described in Japanese Unexamined Patent Application Publication No. 2011-190450A and a conventional mercaptosilane, such rubber compositions do not satisfy the levels of wet performance and processability required recently, and there is room for improvement of wear resistance.

SUMMARY

The present technology provides a rubber composition for a tire having excellent wet performance and wear resistance when formed into a tire, as well as excellent processability.

A rubber composition for a tire containing silica in a quantity from 60 to 200 parts by mass per 100 parts by mass of diene rubber, a polysiloxane represented by Formula (1) as a sulfur-containing silane coupling agent, contained in a quantity from 1 to 20 mass % relative to the content of silica, and a thiuram disulfide vulcanization accelerator represented by Formula (I), contained in a quantity from 0.05 to 3.0 parts by mass, has excellent wet performance and wear resistance when formed into a tire, as well as excellent processability.

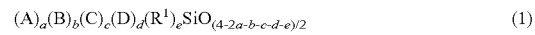

[Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \leq a < 1$, $0 \leq b < 1$, $0 < c < 3$, $0 < d < 1$, $0 \leq e < 2$, and $0 < 2a+b+c+d+e < 4$. However, either a or b is not 0.]

Formula 1

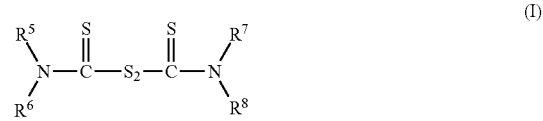

[In Formula (I), $R^5$, $R^6$, $R^7$, and $R^8$ are, each independently, a hydrocarbon group having from 2 to 18 carbon atoms.]

That is, the present technology provides the following rubber composition for a tire and a pneumatic tire using the same.

1. A rubber composition for a tire, comprising: silica contained in a quantity from 60 to 200 parts by mass per 100 parts by mass of diene rubber; a polysiloxane represented by Formula (1) as a sulfur-containing silane coupling agent, contained in a quantity from 1 to 20 mass % relative to the content of silica; and a thiuram disulfide vulcanization accelerator represented by Formula (I), contained in a quantity from 0.05 to 3.0 parts by mass.

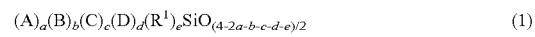

[Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \leq a < 1$, $0 \leq b < 1$, $0 < c < 3$, $0 < d < 1$, $0 \leq e < 2$, and $0 < 2a+b+c+d+e < 4$. However, either a or b is not 0.]

Formula 2

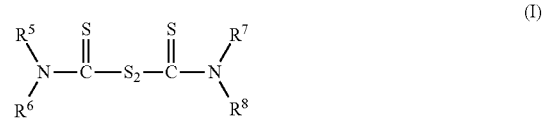

[In Formula (I), $R^5$, $R^6$, $R^7$, and $R^8$ are, each independently, a hydrocarbon group having from 2 to 18 carbon atoms.]

2. The rubber composition for a tire according to the above [1], further comprising from 0.1 to 3.0 parts by mass of guanidine vulcanization accelerator per 100 parts by mass of the diene rubber, the amount of the thiuram disulfide vulcanization accelerator being from 0.05 to 2.0 parts by mass per 100 parts by mass of the diene rubber.

3. The rubber composition for a tire according to the above [1] or [2], further comprising a terpene resin.

4. The rubber composition for a tire according to the above [3], wherein the amount of the terpene resin is from 1 to 30 parts by mass per 100 parts by mass of the diene rubber, and the terpene resin is an aromatic modified terpene resin having a softening point from 60 to 150° C.

5. The rubber composition for a tire according to any one of the above [1] to [4], wherein b in Formula (1) is greater than 0.

6. A pneumatic tire having tire treads formed using the rubber composition for a tire described in any one of the above [1] to [5].

The rubber composition for a tire of the present technology has excellent wet performance and wear resistance as well as excellent processability.

The pneumatic tire of the present technology has excellent wet performance and wear resistance as well as excellent processability.

BRIEF DESCRIPTION OF THE DRAWING(S)

FIG. 1 is a partial cross-sectional schematic view of a tire that represents one embodiment of the pneumatic tire of the present technology.

DETAILED DESCRIPTION

The present technology is described in detail below.

The rubber composition of the present technology is a rubber composition for a tire, comprising: silica contained in a quantity from 60 to 200 parts by mass per 100 parts by mass of diene rubber; a polysiloxane represented by Formula (1) as a sulfur-containing silane coupling agent, contained in a quantity from 1 to 20 mass % relative to the content of silica; and a thiuram disulfide vulcanization accelerator represented by Formula (I), contained in a quantity from 0.05 to 3.0 parts by mass.

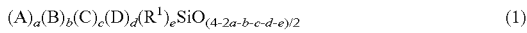

[Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \leq a < 1$, $0 \leq b < 1$, $0 < c < 3$, $0 < d < 1$, $0 \leq e < 2$, and $0 < 2a+b+c+d+e < 4$. However, either a or b is not 0.]

Formula 3

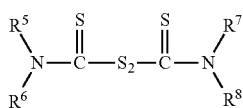

(I)

[In Formula (I), $R^5$, $R^6$, $R^7$, and $R^8$ are, each independently, a hydrocarbon group having from 2 to 18 carbon atoms.]

The rubber composition for a tire according to the present technology is also referred to as the "composition of the present technology" hereinafter. In addition, the polysiloxane represented by Formula (1) is also referred to as the "polysiloxane represented by the average composition formula of Formula (1)".

The composition of the present technology has excellent wet performance and wear resistance as well as excellent processability as a result of using a polysiloxane represented by the average composition formula of Formula (1) in combination with a thiuram disulfide vulcanization accelerator represented by Formula (I) in a rubber composition containing a diene rubber and silica.

In the present technology, the polysiloxane represented by the average composition formula of Formula (1) makes it possible to blend silica into the rubber composition in a large quantity or to sufficiently disperse a large amount of silica into the rubber composition.

The present inventors believe that the rubber composition for a tire according to the present technology achieves the effects described above as follows.

The skeleton of the sulfur-containing silane coupling agent contained in the rubber composition for a tire according to the present technology [polysiloxane represented by the average composition formula of Formula (1)] is a siloxane structure. In addition, when the sulfur-containing silane coupling agent has a monovalent hydrocarbon group having from 5 to 10 carbon atoms represented by B, B may function as an effective protecting group with respect to the mercapto group. Therefore, the vicinity of the mercapto group of the sulfur-containing silane coupling agent is thought to be even bulkier than a conventional mercaptosilane due to the siloxane structure of the skeleton, and also due to the presence of B when the agent contains B.

Due to such a bulky structure, the mercapto group of the sulfur-containing silane coupling agent is protected by the thiuram disulfide vulcanization accelerator before vulcanization, and the Mooney scorch time of the rubber composition of the tire according to the present technology is long, and processing stability is assured.

However, in the present technology, it can be said that such a bulky structure of the sulfur-containing silane coupling agent does not inhibit the acceleration of the vulcanization rate (vulcanization acceleration) during vulcanization. It is thought that the mercapto group of the sulfur-containing silane coupling agent can interact and/or react with the diene rubber as a result of heating or the like at the time of vulcanization. Therefore, the composition of the present technology can achieve both processing stability and a fast vulcanization rate at the time of vulcanization.

In addition, the sulfur-containing silane coupling agent may have better affinity and reactivity with silica than conventional mercaptosilanes since it has a hydrolyzable group represented by C and a siloxane structure. Further, when the molecular weight of the sulfur-containing silane coupling agent is within an appropriate range, it is anticipated that the affinity and reactivity with silica will be even better. It is thought that the rubber composition for a tire according to the present technology achieves excellent wet performance and abrasion resistance due to these factors.

In this way, the composition of the present technology has excellent wet performance, wear resistance, and processability, and has an excellent balance of these properties.

The above mechanism is an inference by the inventors of the present application, but if the mechanism is a mechanism other than that described above, it is still within the scope of the present technology.

The diene rubber contained in the composition of the present technology is not particularly limited. Examples thereof include styrene butadiene copolymer rubber (SBR), natural rubber (NR), isoprene rubber (IR), butadiene rubber (BR), chloroprene rubber (CR), acrylonitrile butadiene copolymer rubber (NBR), ethylene-propylene-diene copolymer rubber (EPDM), styrene-isoprene copolymer rubber, isoprene-butadiene copolymer rubber, nitrile rubber, and hydrogenated nitrile rubber.

A single diene rubber can be used, or a combination of two or more types can be used.

Among these, the diene rubber is preferably SBR and/or BR because a tire with superior wet performance and wear resistance as well as excellent low rolling resistance can be produced.

The SBR is not particularly limited. The SBR may be modified by a hydroxy group, a polyorganosiloxane group, a carbonyl group, an amino group, or the like.

The weight average molecular weight of the SBR is preferably from 500,000 to 2,000,000 and more preferably from 700,000 to 1,500,000 from the perspective of being able to achieve both grip performance and processability. In the present technology, the weight average molecular weight of the SBR is determined in terms of polystyrene by gel permeation chromatography (GPC) using toluene as a solvent.

The SBR preferably contains from 30 to 50 mass % of an aromatic vinyl (called the "styrene quantity" hereinafter) and has a vinyl bond content of from 20 to 70 mass % in the conjugated diene in order to be able to produce a tire having superior wet performance and excellent low rolling resistance.

The content (proportion) of the SBR is preferably from 50 to 90 mass %, and more preferably from 60 to 80 mass % of the diene rubber in order to be able to produce a tire having superior wet performance and excellent low rolling resistance. When SBR and BR are used in combination, the SBR content is the same as that stated above.

The BR is not particularly limited. Examples thereof include conventionally known substances.

The content (proportion) of the BR is preferably not less than 50 mass %, and more preferably not less than 60 mass %, of the diene rubber in order to be able to produce a tire having superior wet performance and excellent low rolling resistance.

When SBR and BR are used in combination, the content (proportion) of the BR is preferably from 10 to 50 mass %, and more preferably from 20 to 40 mass %, of the diene rubber in order to be able to produce a tire having superior wet performance and excellent low rolling resistance.

The silica contained in the composition of the present technology is not particularly limited, and may be any conventionally known silica compounded in rubber compositions for applications such as tires and the like.

Specific examples of the silica contained in the composition of the present technology include fumed silica, calcined silica, precipitated silica, ground silica, fused silica, colloidal silica, and the like. A single silica can be used, or a combination of two or more types can be used.

The CTAB adsorption specific surface area of the silica is preferably not less than 150 m$^2$/g, more preferably greater than 160 m$^2$/g, and even more preferably from 170 to 230 m$^2$/g. Here, the CTAB specific surface area was measured in accordance with the CTAB adsorption method disclosed in JIS K6217-3:2001.

In the present technology, the silica content is from 60 to 200 parts by mass per 100 parts by mass of the diene rubber, and is preferably from 60 to 150 parts by mass, and more preferably from 70 to 140 parts by mass because the wet performance and wear resistance of the obtained tire are better and the low rolling resistance and strength also improve.

The sulfur-containing silane coupling agent contained in the composition of the present technology will be described hereinafter.

The sulfur-containing silane coupling agent contained in the composition of the present technology is a polysiloxane represented by the following Formula (1).

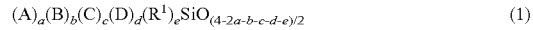
$$(A)_a(B)_b(C)_c(D)_d(R^1)_e SiO_{(4-2a-b-c-d-e)/2} \quad (1)$$

[Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \le a < 1$, $0 \le b < 1$, $0 < c < 3$, $0 < d < 1$, $0 \le e < 2$, and $0 < 2a+b+c+d+e < 4$. However, either a or b is not 0.]

In the present technology, since the sulfur-containing silane coupling agent contains C, it has excellent affinity and/or reactivity with silica.

Since the sulfur-containing silane coupling agent contains D, it can interact and/or react with the diene rubber, which yields excellent wet performance and abrasion resistance.

When the sulfur-containing silane coupling agent contains A, the wet performance, wear resistance, and processability (in particular, the maintenance and prolongation of the Mooney scorch time) are superior.

When the sulfur-containing silane coupling agent contains B, the mercapto group is protected, and the Mooney scorch time becomes longer, while at the same time, the processability is excellent due to outstanding affinity with the rubber.

The sulfur-containing silane coupling agent contained in the composition of the present technology has a siloxane skeleton as its skeleton. The siloxane skeleton may have a linear, branched, or three-dimensional structure, or a combination thereof.

In Formula (1), A is a divalent organic group containing a sulfide group (also called a sulfide group-containing organic group hereafter). The organic group may be, for example, a hydrocarbon group optionally having a hetero atom such as an oxygen atom, a nitrogen atom, or a sulfur atom.

Of these, a group represented by formula (2) is preferable.

$$*-(CH_2)_n-S_x-(CH_2)_n- \quad (2)$$

In formula (2), n is an integer from 1 to 10, among which an integer from 2 to 4 is preferable.

In formula (2), x is an integer from 1 to 6, among which an integer from 2 to 4 is preferable.

In formula (2), * indicates a bond position.

Specific examples of the group represented by formula (2) include *—$CH_2$—$S_2$—$CH_2$—*, *—$C_2H_4$—$S_2$—$C_2H_4$—*, *—$C_3H_6$—$S_2$—$C_3H_6$—*, *—$C_4H_8$—$S_2$—$C_4H_8$—*, *—$CH_2$—$S_4$—$CH_2$—*, *—$C_2H_4$—$S_4$—$C_2H_4$—*, *—$C_3H_6$—$S_4$—$C_3H_6$—*, and *—$C_4H_8$—$S_4$—$C_4H_8$—*.

In Formula (1), B is a monovalent hydrocarbon group having from 5 to 10 carbon atoms, specific examples of which include hexyl groups, octyl groups, and decyl groups. Of these, B is preferably a monovalent hydrocarbon group having from 8 to 10 carbon atoms from the perspective of protecting the mercapto group, having a long Mooney scorch time, having superior processability, having superior wet characteristics and wear resistance, and having excellent low rolling resistance.

In Formula (1), C is a hydrolyzable group, specific examples of which include alkoxy groups, phenoxy groups, carboxyl groups, and alkenyloxy groups. Of these, a group represented by the following formula (3) is preferable.

$$*—OR^2 \quad (3)$$

In formula (3), $R^2$ is an alkyl group having from 1 to 20 carbon atoms, an aryl group having from 6 to 10 carbon atoms, an aralkyl group (aryl alkyl group) having from 6 to 10 carbon atoms, or an alkenyl group having from 2 to 10 carbon atoms, among which an alkyl group having from 1 to 5 carbon atoms is preferable. Specific examples of the alkyl group having from 1 to 20 carbon atoms include a methyl group, an ethyl group, a propyl group, a butyl group, a hexyl group, an octyl group, a decyl group, an octadecyl group, and the like. Specific examples of the aryl group having from 6 to 10 carbon atoms include a phenyl group, a tolyl group, and the like. Specific examples of the aralkyl group having from 6 to 10 carbon atoms include a benzyl group, a phenylethyl group, and the like. Specific examples of alkenyl groups having from 2 to 10 carbon atoms include vinyl groups, propenyl groups, and pentenyl groups.

In formula (3), * indicates a bond position.

In Formula (1), D is an organic group containing a mercapto group. Of these, a group represented by the following formula (4) is preferable.

$$*—(CH_2)_m—SH \quad (4)$$

In formula (4), m is an integer from 1 to 10, among which an integer from 1 to 5 is preferable.

In formula (4), * indicates a bond position.

Specific examples of the group represented by formula (4) include *—$CH_2SH$, *—$C_2H_4SH$, *—$C_3H_6SH$, *—$C_4H_8SH$, *—$C_5H_{10}SH$, *—$C_6H_{12}SH$, *—$C_7H_{14}SH$, *—$C_8H_{16}SH$, *—$C_9H_{18}SH$, and *—$C_{10}H_{20}SH$.

In Formula (1), $R^1$ is a monovalent hydrocarbon group having from 1 to 4 carbon atoms. Specific examples include a methyl group, an ethyl group, a propyl group, and a butyl group.

In Formula (1), a to e satisfy the relational expressions $0 \leq a < 1$, $0 \leq b < 1$, $0 < c < 3$, $0 < d < 1$, $0 \leq e < 2$, and $0 < 2a+b+c+d+e < 4$. However, either a or b is not 0.

The value of a of the polysiloxane represented by the average composition formula of Formula (1) is preferably greater than 0 ($0 < a$) in that the resulting Mooney scorch time is superior. That is, a case in which the substance has a sulfide-containing organic group is a preferred aspect. Of these, it is preferable for the expression $0 < a \leq 0.50$ to be satisfied in that processability is even better, wet performance is superior, and low rolling resistance is also excellent.

In addition, the value of a of the polysiloxane represented by the average composition formula of Formula (1) is preferably 0 in that the wet performance and wear resistance are superior and low rolling resistance is excellent. That is, a case in which the substance does not have a sulfide-containing organic group is a preferred aspect.

In Formula (1), b is preferably greater than 0 and more preferably satisfies the expression $0.10 \leq b \leq 0.89$ in that wet characteristics and processability are superior and low rolling resistance is excellent.

In Formula (1), c preferably satisfies the expression $1.2 \leq c \leq 2.0$ in that wet characteristics and processability are superior, silica dispersibility is superior, and low rolling resistance is excellent.

In Formula (1), d preferably satisfies the expression $0.1 \leq d \leq 0.8$ in that wet characteristics and processability are superior, and low rolling resistance is excellent.

The polysiloxane represented by the average composition formula of Formula (1) is preferably such that, in Formula (1), A is a group represented by Formula (2), C is a group represented by Formula (3), and D is a group represented by Formula (4) because silica dispersibility is good and processability is superior, and more preferably, A is a group represented by Formula (2), C is a group represented by Formula (3), D is a group represented by Formula (4), and B is a monovalent hydrocarbon group having from 8 to 10 carbon atoms for the above reasons as well as because the mercapto group is protected and Mooney scorch time is long, processability is superior, wet performance and wear resistance are superior, and low rolling resistance is excellent.

The weight average molecular weight of the polysiloxane represented by the average composition formula of Formula (1) is preferably from 500 to 2,300 and more preferably from 600 to 1,500 from the perspective of having superior wet performance and processability, and excellent low rolling resistance. The molecular weight of the polysiloxane is the weight average molecular weight determined in terms of polystyrene by gel permeation chromatography (GPC) using toluene as a solvent.

The mercapto equivalent weight of the polysiloxane represented by the average composition formula of Formula (1) determined by the acetic acid/potassium iodide/potassium iodate addition-sodium thiosulfate solution titration method is preferably from 550 to 1900 g/mol and more preferably from 600 to 1800 g/mol, from the perspective of having excellent vulcanization reactivity.

The method for producing the polysiloxane is not particularly limited. For example, it may be produced by hydrolyzing and condensing a composition of an organosilicon compound containing as a starting material at least a silane coupling agent having an organic group containing a mercapto group (silane coupling agent having a mercapto group) [equivalent to D in Formula (1)] and a hydrolyzable group [may be equivalent to C in Formula (1); similarly hereinafter].

A specific example is a method of hydrolyzing and condensing an organosilicon compound represented by the following formula (6) (for example, p=5 to 10) and an organosilicon compound represented by the following formula (7). Further, an organosilicon compound represented by the following formula (5) may also be used. In addition, an organosilicon compound represented by Formula (8) (q=1 to 4) may also be used.

Of these, it is preferable to use at least an organosilicon compound represented by formula (6) (for example, p=5 to 10) and organosilicon compounds represented by formula (7) and formula (5) in that the scorch resistance is superior.

In addition, it is preferable to use at least an organosilicon compound represented by Formula (6) (for example, p=5 to 10) and an organosilicon compound represented by Formula (7) because wet performance and wear resistance are superior and low rolling resistance is excellent.

Formula 5

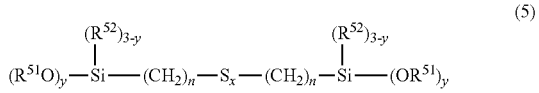

In formula (5), $R^{51}$ is an alkyl group having from 1 to 20 carbon atoms, an aryl group having from 6 to 10 carbon atoms, or an alkenyl group having from 2 to 10 carbon atoms, among which an alkyl group having from 1 to 5 carbon atoms is preferable. Specific examples of the alkyl group having from 1 to 20 carbon atoms include a methyl group, an ethyl group, a propyl group, a butyl group, a hexyl group, an octyl group, a decyl group, an octadecyl group, and the like. Specific examples of aryl groups having from 6 to 10 carbon atoms include phenyl groups, tolyl groups, and naphthyl groups. Specific examples of alkenyl groups having from 2 to 10 carbon atoms include vinyl groups, propenyl groups, and pentenyl groups.

In formula (5), $R^{52}$ is an alkyl group having from 1 to 10 carbon atoms or an aryl group having from 6 to 10 carbon atoms. Specific examples of alkyl groups having from 1 to 10 carbon atoms include methyl groups, ethyl groups, propyl groups, butyl groups, hexyl groups, octyl groups, and decyl groups. Specific examples of aryl groups having from 6 to 10 carbon atoms are the same as those of $R^{51}$ described above.

In formula (5), the definition and preferred aspects of n are the same as those of n in formula (2) described above.

In formula (5), the definition and preferred aspects of x are the same as those of x in formula (2) described above.

In formula (5), y is an integer from 1 to 3.

Specific examples of the organosilicon compound represented by formula (5) include bis(trimethoxysilylpropyl) tetrasulfide, bis(triethoxysilylpropyl)tetrasulfide, bis(trimethoxysilylpropyl)disulfide, and bis(triethoxysilylpropyl)disulfide.

Formula 6

In formula (6), the definition, specific examples, and preferred aspects of $R^{61}$ are the same as those of $R^{51}$ described above.

In formula (6), the definition, specific examples, and preferred aspects of $R^{62}$ are the same as those of $R^{52}$ described above.

In formula (6), the definition of z is the same as that of y described above.

In Formula (6), p is an integer from 5 to 10. Here, p is preferably an integer from 5 to 10 from the perspective of having superior wet performance, low rolling resistance, and processability and having excellent affinity with the diene rubber.

Specific examples of the organosilicon compound represented by Formula (6) include pentyltrimethoxysilane, pentylmethyldimethoxysilane, pentyltriethoxysilane, pentylmethyldiethoxysilane, hexyltrimethoxysilane, hexylmethyldimethoxysilane, hexyltriethoxysilane, hexylmethyldiethoxysilane, octyltrimethoxysilane, octylmethyldimethoxysilane, octyltriethoxysilane, octylmethyldiethoxysilane, decyltrimethoxysilane, decylmethyldimethoxysilane, decyltriethoxysilane, and decylmethyldiethoxysilane.

Formula 7

In formula (7), the definition, specific examples, and preferred aspects of $R^{71}$ are the same as those of $R^{51}$ described above.

In formula (7), the definition, specific examples, and preferred aspects of $R^{72}$ are the same as those of $R^{52}$ described above.

In formula (7), the definition and preferred aspects of m are the same as those of m in formula (4) described above.

In formula (7), the definition of w is the same as that of y described above.

Specific examples of the organosilicon compound represented by formula (7) include α-mercaptomethyltrimethoxysilane, α-mercaptomethylmethyldimethoxysilane, α-mercaptomethyltriethoxysilane, α-mercaptomethylmethyldiethoxysilane, γ-mercaptopropyltrimethoxysilane, γ-mercaptopropylmethyldimethoxysilane, γ-mercaptopropyltriethoxysilane, and γ-mercaptopropylmethyldiethoxysilane.

Formula 8

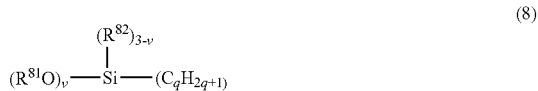

In Formula (8), the definition, specific examples, and preferred embodiments of $R^{81}$ are the same as those of $R^{51}$ described above.

In Formula (8), the definition, specific examples, and preferred embodiments of $R^{82}$ are the same as those of $R^{52}$ described above.

In Formula (8), the definition of v is the same as that of y described above.

In Formula (8), q is an integer from 1 to 4.

Specific examples of the organosilicon compound represented by Formula (8) include methyltrimethoxysilane, dimethyldimethoxysilane, methyltriethoxysilane, methylethyldiethoxysilane, propyltrimethoxysilane, propylmethyldimethoxysilane, and propylmethyldiethoxysilane.

When a silane coupling agent having a mercapto group [for example, an organosilicon compound represented by Formula (7)], a silane coupling agent having a hydrocarbon group having from 5 to 10 carbon atoms [for example, an organosilicon compound represented by Formula (6)], and/or a silane coupling agent having a hydrocarbon group having from 1 to 4 carbon atoms [for example, an organosilicon compound represented by Formula (8)] are used in combination as the organosilicon compounds used to produce the polysiloxane, the mixing ratio (molar ratio) of the silane coupling agent having a mercapto group to the silane coupling agent having a hydrocarbon group having from 5 to 10 carbon atoms and/or the silane coupling agent having a hydrocarbon group having from 1 to 4 carbon atoms [silane coupling agent having a mercapto group/(silane coupling agent having a hydrocarbon group having from 5 to 10 carbon atoms and/or silane coupling agent having from a hydrocarbon group having from 1 to 4 carbon atoms)] is preferably from 1.1/8.9 to 6.7/3.3, and more preferably from 1.4/8.6 to 5.0/5.0, from the perspective of having superior wet performance, wear resistance, and processability and excellent low rolling resistance.

When a silane coupling agent having a mercapto group [for example, an organosilicon compound represented by Formula (7)] and a silane coupling agent having a sulfide group [for example, an organosilicon compound represented by Formula (5)] are used in combination as the organosilicon compounds used to produce the polysiloxane, the mixing ratio (molar ratio) of the silane coupling agent having a mercapto group to the silane coupling agent having a sulfide group (silane coupling agent having a mercapto group/silane coupling agent having a sulfide group) is preferably from 2.0/8.0 to 8.9/1.1 and more preferably from 2.5/7.5 to 8.0/2.0 from the perspective of having superior wet performance, wear resistance, and processability and excellent low rolling resistance.

When a silane coupling agent having a mercapto group [for example, an organosilicon compound represented by Formula (7)], a silane coupling agent having a sulfide group [for example, an organosilane compound represented by Formula (5)], a silane coupling agent having a hydrocarbon group having from 5 to 10 carbon atoms [for example, an organosilicon compound represented by Formula (6)], and/or a silane coupling agent having a hydrocarbon group having from 1 to 4 carbon atoms [for example, an organosilicon compound represented by Formula (8)] are used in combination as the organosilicon compounds used to produce the polysiloxane, the amount of silane coupling agent having a mercapto group is preferably from 10.0 to 73.0% of the total amount (moles) of the three (or four) silane coupling agents listed above. The amount of the silane coupling agent having a sulfide group is preferably from 5.0 to 67.0% of the total amount of the three (or four) agents listed above. The amount of the silane coupling agents other than the silane coupling agents having a sulfide group or a mercapto group is preferably from 16.0 to 85.0% of the total amount of the three (or four) agents listed above.

A solvent may be used as necessary when producing the polysiloxane. The solvent is not particularly limited, but specific examples include aliphatic hydrocarbon solvents such as pentane, hexane, heptane, and decane, ether solvents such as diethyl ether, tetrahydrofuran, and 1,4-dioxane, amide solvents such as formamide, dimethylformamide, and N-methylpyrrolidone, aromatic hydrocarbon solvents such as benzene, toluene, and xylene, and alcohol solvents such as methanol, ethanol, and propanol.

In addition, a catalyst may be used as necessary when producing the polysiloxane described above.

In the present technology, examples of catalysts that can be used include acidic catalysts such as hydrochloric acid and acetic acid; Lewis acid catalysts such as ammonium fluoride; alkali metal salts such as sodium hydroxide, potassium hydroxide, sodium carbonate, sodium acetate, potassium acetate, sodium hydrogen carbonate, potassium carbonate, potassium hydrogen carbonate, calcium carbonate, sodium methoxide, and sodium ethoxide; alkali earth metal salts; and amine compounds such as triethylamine, tributylamine, pyridine, and 4-dimethylaminopyridine.

The catalyst described above is preferably not an organic metal compound containing Sn, Ti, or Al as a metal. When such an organic metal compound is used, the metal is introduced into the polysiloxane skeleton, and it may not be possible to obtain the specific polysiloxane described above (in which no metals other than silicon atoms (for example, Sn, Ti, or Al) are present in the skeleton).

When an organic metal compound containing Sn, Ti, or Al is not used as a catalyst, metals derived from the catalyst are not introduced into the molecules of the polysiloxane (for example, metals are not introduced into the polysiloxane skeleton), and the rubber composition for a tire tread according to the present technology is not hardened or gelified by moisture in the air in either a normal atmosphere or a high-humidity environment, which yields excellent storage stability.

The amount of the catalyst is preferably from 0.01 to 10 parts by mass and more preferably from 0.05 to 1 part by mass per 100 parts by mass of the organosilicon compound used as a starting material from the perspective of having superior wet performance and processability and having excellent low rolling resistance and storage stability.

The sulfur-containing silane coupling agent can be used alone or as a combination of two or more types.

In the rubber composition for a tire of the present technology, the content of the sulfur-containing silane coupling agent is from 1 to 20 mass % of the silica content, and, from the perspective of having superior wet performance, wear resistance, and processability and excellent low rolling resistance, is preferably from 2 to 20 mass %, more preferably from 3 to 18 mass %, even more preferably from 4 to 16 mass %, and particularly preferably from 5 to 14 mass %.

When the content of the sulfur-containing silane coupling agent exceeds 20 mass % of the silica content, the scorch time is short and processability is poor.

The thiuram disulfide vulcanization accelerator contained in the composition of the present technology will be described below. The thiuram disulfide vulcanization accelerator contained in the composition of the present technology is a compound represented by Formula (I) below.

Formula I

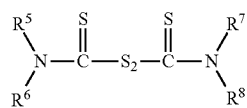

(I)

In Formula (I), $R^5$, $R^6$, $R^7$, and $R^8$ are, each independently, a hydrocarbon group having from 2 to 18 carbon atoms. The hydrocarbon group may be an aliphatic hydrocarbon group, an alicyclic hydrocarbon group, an aromatic hydrocarbon group, or a combination thereof, and may have a heteroatom such as, for example, an oxygen atom, a nitrogen atom, or a sulfur atom, and may have an unsaturated bond. Examples of the hydrocarbon group include aliphatic hydrocarbon groups such as a methyl group, an ethyl group, and a butyl group, alicyclic hydrocarbon groups such as a cyclohexyl group, aromatic hydrocarbon groups such as a phenyl group, and aralkyl groups such as a benzyl group.

Examples of the thiuram disulfide vulcanization accelerator include tetramethylthiuram disulfide, tetraethylthiuram ethyl disulfide, tetrabutylthiuram disulfide, tetrabenzylthiuram disulfide, and the like.

Among these, $R^5$ to $R^8$ are preferably aralkyl groups, and more preferably benzyl groups (commercially available as TBzTD, produced by Flexsys Inc.) from the perspective of superior wet performance, wear resistance, and processability (particularly maintaining and extending Mooney scorch time and accelerating the vulcanization rate during vulcanization).

In the present technology, the amount of thiuram disulfide vulcanization accelerator is from 0.05 to 3.0 parts by mass per 100 parts by mass of the diene rubber. When in such a range, wet performance, wear resistance, and processability (particularly maintaining and extending Mooney scorch time and accelerating the vulcanization rate during vulcanization) are excellent. If this amount is small, the vulcanization acceleration effect is insufficient, and if too large, crosslink density is too high and the rubber becomes hard, which are undesirable.

For these reasons, the amount of thiuram disulfide vulcanization accelerator is preferably from 0.05 to 2.5 parts by mass, and more preferably from 0.05 to 2.0 parts by mass, per 100 parts by mass of the diene rubber.

The composition of the present technology may further comprise a guanidine vulcanization accelerator and/or a sulfenamide vulcanization accelerator as vulcanization accelerators other than the thiuram disulfide vulcanization accelerator.

When the composition of the present technology further comprises a guanidine vulcanization accelerator and/or sulfenamide vulcanization accelerator, the vulcanization rate during vulcanization is faster and wear resistance and wet performance are superior. The guanidine vulcanization accelerator and sulfonamide vulcanization accelerator are not particularly limited provided that they can be used in, for example, a rubber composition, but diphenylguanidine (DPG) is preferred for the same reasons as above.

When the composition of the present technology further comprises a guanidine vulcanization accelerator and/or sulfenamide vulcanization accelerator, the amount of the guanidine vulcanization accelerator and/or sulfenamide vulcanization accelerator (the total amount thereof when both are used in combination; similarly hereinafter) is preferably from 0.1 to 3.0 parts by weight, and more preferably from 0.1 to 2.5 parts by weight, per 100 parts by weight of the diene rubber because the vulcanization rate during vulcanization is faster and wear resistance and wet performance are superior.

Additionally, when the composition of the present technology further comprises a guanidine vulcanization accelerator and/or sulfenamide vulcanization accelerator, the amount of the thiuram disulfide vulcanization accelerator is preferably from 0.05 to 2.0 parts by weight, and more preferably from 0.05 to 1.5 parts by weight, per 100 parts by weight of the diene rubber because the vulcanization rate during vulcanization is faster and wear resistance and wet performance are superior.

The composition of the present technology may further comprise a terpene resin. In this case, the balance of wet performance and low rolling resistance is superior. The terpene resin may be a polymer that has at least a terpene monomer as the monomer, and it may be a homopolymer or copolymer. Furthermore, it may be modified by, for example, an aromatic compound. Examples of the terpene monomer include α-pinene, β-pinene, dipentene, limonene, and derivatives thereof.

Examples of the aromatic compound include styrene, α-methylstyrene, vinyl toluene, indene, and phenols.

Examples of the terpene resin include aromatic modified terpene resins. An aromatic modified terpene resin is preferred because tan δ at 0° C. of the rubber composition is high due to good miscibility with the diene rubber, and because wet performance and wear resistance are superior and the balance with low rolling resistance is excellent.

The softening point of the terpene resin (in particular, an aromatic modified terpene resin) is preferably from 60 to 150° C. and more preferably from 70 to 130° C. from the perspective of having superior wet performance and wear resistance.

The terpene resin is not particularly limited in its structure. Examples thereof include conventionally known substances. The terpene resin may be used alone or as a combination of two or more types.

The amount of the terpene resin is preferably from 1 to 30 parts by mass and more preferably from 3 to 20 parts by mass per 100 parts by mass of the diene rubber component from the perspective of having superior wet performance and wear resistance.

The composition of the present technology may further contain additives as necessary within a scope that does not inhibit the effect or purpose thereof. Examples of additives include various additives typically used in rubber compositions for tires, such as rubbers other than diene rubber, silane coupling agents other than the polysiloxanes represented by the average composition formula of Formula (1), fillers other than silica (for example, carbon black, clay, mica, talc, calcium carbonate, aluminum hydroxide, aluminum oxide, and titanium oxide), vulcanization accelerators other than thiuram disulfide vulcanization accelerators, resins other than terpene resins, zinc oxide, stearic acid, antiaging agents, processing aids, aroma oils, process oils, liquid polymers, thermosetting resins, and vulcanizing agents.

When the composition of the present technology comprises a silane coupling agent other than the polysiloxanes represented by the average composition formula of Formula (1), specific examples of such a silane coupling agent include mercaptosilanes and sulfide silanes having one silicon atom.

Examples of mercaptosilanes include $C_{13}H_{27}O$—$(CH_2CH_2O)_5]_2(CH_2CH_2O)Si(CH_2)_2SH$, 3-mercaptopropyl trimethoxysilane, and 3-mercaptopropyl triethoxysilane.

Examples of sulfide silanes include bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, and bis(3-trimethoxysilylpropyl)disulfide.

The silane coupling agents other than the polysiloxanes represented by the average composition formula of Formula (1) may be used as one type alone or in a combination of two or more types.

The method for producing the composition of the present technology is not particularly limited, and specific examples thereof include a method whereby each of the above-mentioned components is kneaded using a publicly known method and device (e.g. Banbury mixer, kneader, roll, and the like).

In addition, the composition of the present technology can be vulcanized or crosslinked under conventional, publicly known vulcanizing or crosslinking conditions.

An example of an application of the composition of the present technology is a tire.

Next, the pneumatic tire of the present technology will be described.

The pneumatic tire of the present technology is a pneumatic tire having tire treads formed by using the rubber composition for a tire according to the present technology.

Provided that it is used in at least the tire treads, the rubber composition for a tire may be used in the bead portion or sidewall portion, aside from the tire treads.

The pneumatic tire of the present technology will be described hereinafter with reference to the attached drawings. The pneumatic tire of the present technology is not limited to the attached drawings.

FIG. 1 is a partial cross-sectional schematic view of a tire that represents one embodiment of the pneumatic tire of the present technology.

In FIG. 1, reference number 1 denotes a bead portion, reference number 2 denotes a sidewall portion, and reference number 3 denotes a tire tread.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The pneumatic tire of the present technology is not particularly limited with the exception that the rubber composition for a tire according to the present technology is used for the tire treads of a pneumatic tire, and, the tire can be produced by, for example, a conventionally known method. In addition to ordinary air or air with an adjusted oxygen partial pressure, inert gasses such as nitrogen, argon, and helium can be used as the gas with which the tire is filled.

EXAMPLES

The present technology will be described below by means of working examples. The present technology is not limited to such working examples.

<Production Method for Polysiloxane 1>

107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2 L separable flask provided with an agitator, a reflux condenser, a dropping funnel and a thermometer, and then a mixed solution containing 37.8 g (2.1 mol) of 0.5 N hydrochloric acid and 75.6 g of ethanol was added in a dropwise manner at room temperature. It was then stirred for 2 hours at 80° C. Then, it was filtered, and 17.0 g of 5% KOH/EtOH solution was added in a dropwise manner, and stirred for 2 hours at 80° C. Then, by vacuum concentration and filtration, 480.1 g of polysiloxane in the form of a brown transparent liquid was obtained. As a result of performing measurements by GCP, the average molecular weight of the obtained polysiloxane was 840, and the average degree of polymerization was 4.0 (preset degree of polymerization: 4.0). In addition, as a result of measuring the mercapto equivalent weight of the obtained polysiloxane by an acetic acid/potassium iodide/potassium iodate addition/sodium thiosulfate solution titration method, the mercapto equivalent weight was 730 g/mol, and it was thus confirmed that the preset mercapto group content was achieved. The polysiloxane obtained as described above is represented by the following average composition formula.

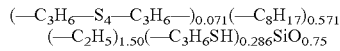

The obtained polysiloxane was used as polysiloxane 1.

<Production Method for Polysiloxane 2>

190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 162.0 g of ethanol were placed in a 2 L separable flask provided with an agitator, a reflux condenser, a dropping funnel and a thermometer, and then a mixed solution containing 32.4 g (1.8 mol) of 0.5 N hydrochloric acid and 75.6 g of ethanol was added in a dropwise manner at room temperature. It was then stirred for 2 hours at 80° C. Then, it was filtered, and 14.6 g of 5% KOH/EtOH solution was added in a dropwise manner, and stirred for 2 hours at 80° C. Then, by vacuum concentration and filtration, 412.3 g of polysiloxane in the form of a colorless transparent liquid was obtained. As a result of performing measurements by GPC, the average molecular weight of the obtained polysiloxane was 850, and the average degree of polymerization was 4.0 (preset degree of polymerization: 4.0). In addition, the mercapto equivalent weight of the polysiloxane measured by an acetic acid/potassium iodide/potassium iodate addition/sodium thiosulfate solution titration method was 650 g/mol, and it was thus confirmed that the preset mercapto group content was achieved. The polysiloxane obtained as described above is represented by the following average composition formula.

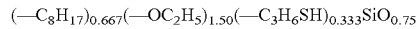

The obtained polysiloxane was used as polysiloxane 2.

<Production Method for Polysiloxane 3>

107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2 separable flask provided with an agitator, a reflux condenser, a dropping funnel and a thermometer, and then a mixed solution containing 42.0 g (2.33 mol) of 0.5 N hydrochloric acid and 75.6 g of ethanol was added in a dropwise manner at room temperature. It was then stirred for 2 hours at 80° C. Then, it was filtered, and 18.9 g of 5% KOH/EtOH solution was added in a dropwise manner, and stirred for 2 hours at 80° C. Then, by vacuum concentration and filtration, 560.9 g of polysiloxane in the form of a brown transparent liquid was obtained. As a result of performing measurements by GPC, the average molecular weight of the obtained polysiloxane was 1,220, and the average degree of polymerization was 6.0 (preset degree of polymerization: 6.0). In addition, the mercapto equivalent weight of the polysiloxane measured by an acetic acid/potassium iodide/potassium iodate addition/sodium thiosulfate solution titration method was 710 g/mol, and it was thus confirmed that the preset mercapto group content was achieved. The polysiloxane obtained as described above is represented by the following average composition formula.

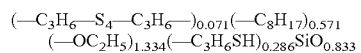

The obtained polysiloxane was used as polysiloxane 3.

(Comparative Polysiloxane 1)

A polysiloxane was obtained by hydrolyzing 3-mercaptopropyltrimethoxysilane (0.1 mol) with water and a concentrated hydrochloric acid aqueous solution and then adding and condensing ethoxymethylpolysiloxane (100 g). The obtained polysiloxane was used as comparative polysiloxane 1.

The comparative polysiloxane 1 has a structure in which the methoxy groups of 3-mercaptopropyltrimethoxysilane and the ethoxy groups of ethoxymethylpolysiloxane are condensed. That is, the only monovalent hydrocarbon group of the comparative polysiloxane 1 is a methyl group. In addition, the comparative polysiloxane 1 does not have a divalent organic group containing a sulfide group.

<Comparative Polysiloxane 2>

A polysiloxane was obtained by hydrolyzing bis (3-(triethoxysilyl) propyl)tetrasulfide (0.1 mol) with water and a concentrated hydrochloric acid aqueous solution and then adding and condensing ethoxymethylpolysiloxane (100 g). The obtained polysiloxane was used as comparative polysiloxane 2.

The comparative polysiloxane 2 has a structure in which the ethoxy groups of bis(3-(triethoxysilyl)propyl)tetrasulfide and the ethoxy groups of ethoxymethylpolysiloxane are condensed. That is, the only monovalent hydrocarbon group of the comparative polysiloxane 2 is a methyl group. In addition, the comparative polysiloxane 2 does not have a divalent organic group containing a mercapto group.

<Production of the Rubber Composition for a Tire>

The components shown in the following table were blended at the proportions (parts by mass) shown in the table.

Specifically, a master batch was obtained by first mixing the components shown in the following table, excluding the sulfur and the vulcanization accelerator, for 10 minutes in a 1.7-liter closed-type Banbury mixer, discharging the mixture, and then cooling the mixture to room temperature. Further, sulfur and a vulcanization accelerator were mixed into the resulting master batch using the Banbury mixer described above so as to obtain a rubber composition for a tire.

In the table, the numeric values in parentheses in the comparative silane coupling agent columns and silane coupling agent columns are the mass % of each component relative to the amount of silica used in that working example or comparative example.

<Production of Vulcanized Rubber>

Vulcanized rubber was produced by press-vulcanizing the rubber composition for a tire (unvulcanized) produced as described above for 20 minutes at 160° C. in a metal mold (15 cm×15 cm×0.2 cm).

The following evaluations were performed using the rubber composition for a tire and vulcanized rubber produced as described above. The results are shown in the tables below.

<tan δ (0° C.)> (Indicator of Wet Performance)

The value of tan δ (0° C.) was measured for the vulcanized rubber produced as described above, at an elongation deformation strain of 10%±2%, an oscillation frequency of 20 Hz, and a temperature of 0° C. using a viscoelastic spectrometer (produced by Iwamoto Manufacturing Corp.) in accordance with JIS K6394:2007.

The results are displayed as an index when the value of tan δ (0° C.) of a reference example is defined as 100. Larger indexes indicate larger tan δ (0° C.) values, which in turn indicates excellent wet performance when used in a tire.

<Wear Resistance>

As the wear resistance of the vulcanized rubber produced as described above, the amount of wear was measured at a temperature of 20° C., a load of 15 N, a slip rate of 50%, and a time of 10 minutes using a Lambourn abrasion tester (produced by Iwamoto Manufacturing Corp.) in accordance with JIS K6264.

The results are displayed as an index when the reciprocal of the value of a reference example is defined as 100. A larger index signifies better wear resistance.

<Mooney Scorch> (Indicator of Scorch Resistance)

For the rubber composition for a tire (unvulcanized) produced as described above, the Mooney scorch time ($t_5$) was measured at a test temperature of 125° C. using an L-type rotor in accordance with JIS K6300-1:2001.

The results are displayed as an index when the value of Mooney scorch time of a reference example is defined as 100. A larger index indicates a longer Mooney scorch time, which in turn indicates excellent scorch resistance (processability).

<$t_{95}$> (Indicator of Vulcanization Rate During Vulcanization)

Using the rubber composition for a tire produced as described above, the $t_{95}$ time (minutes) was measured at an amplitude of 1 degree at 160° C. using an oscillating vulcanization tester in accordance with JIS K6300.

The results are displayed as an index when $t_{95}$ of a reference example (indicated as T95 in the table) is defined as 100. A lower index indicates a faster vulcanization rate, which in turn indicates excellent vulcanization characteristics.

TABLE 1

| | Reference Example | Comparative Example | | | | |
|---|---|---|---|---|---|---|
| | | 1 | 2 | 3 | 4 | 5 |
| SBR (E581) (numbers in parentheses to the right indicate the rubber content) | 96.3 (70) | 96.3 (70) | 96.3 (70) | 96.3 (70) | 96.3 (70) | 96.3 (70) |
| BR | 30 | 30 | 30 | 30 | 30 | 30 |
| Silica | 80 | 80 | 80 | 80 | 80 | 80 |
| Carbon black | 10 | 10 | 10 | 10 | 10 | 10 |
| Comparative silane coupling agent 1 | 8.8 (11%) | 8.8 (11%) | 8.8 (11%) | | | |
| Comparative silane coupling agent 2 | | | | 8.8 (11%) | 8.8 (11%) | |
| Silane coupling agent 1 | | | | | | 8.8 (11%) |
| Silane coupling agent 2 | | | | | | |
| Silane coupling agent 3 | | | | | | |
| Comparative silane coupling agent 3 | | | | | | |
| Comparative silane coupling agent 4 | | | | | | |

TABLE 1-continued

| | | | | | | |
|---|---|---|---|---|---|---|
| Stearic acid | 2.5 | 2.5 | 2.5 | 2.5 | 2.5 | 2.5 |
| Zinc oxide | 2.5 | 2.5 | 2.5 | 2.5 | 2.5 | 2.5 |
| Antiaging agent | 2 | 2 | 2 | 2 | 2 | 2 |
| Terpene resin | | | | | | |
| Process oil | 10 | 10 | 10 | 10 | 10 | 10 |
| Vulcanization accelerator 1 (CZ) | 2 | 2 | 2 | 2 | 2 | 2 |
| Vulcanization accelerator 2 (TBzTD) | | 0.3 | 0.2 | 0.3 | 0.2 | |
| Vulcanization accelerator 3 (DPG) | | | 1 | | 1 | |
| Sulfur | 2 | 2 | 2 | 2 | 2 | 2 |
| Wet performance | 100 | 102 | 103 | 99 | 100 | 105 |
| Wear resistance | 100 | 101 | 102 | 100 | 103 | 103 |
| Mooney scorch | 100 | 94 | 85 | 88 | 80 | 114 |
| T95 | 100 | 90 | 87 | 85 | 83 | 112 |

| | Comparative Example | | | | |
|---|---|---|---|---|---|
| | 6 | 7 | 8 | 9 | 10 |
| SBR (E581) (numbers in parentheses to the right indicate the rubber content) | 96.3 (70) | 96.3 (70) | 96.3 (70) | 96.3 (70) | 96.3 (70) |
| BR | 30 | 30 | 30 | 30 | 30 |
| Silica | 80 | 80 | 40 | 80 | 80 |
| Carbon black | 10 | 10 | 50 | 10 | 10 |
| Comparative silane coupling agent 1 | | | | | |
| Comparative silane coupling agent 2 | | | | | |
| Silane coupling agent 1 | 8.8 (11%) | | | | |
| Silane coupling agent 2 | | 20 (25%) | 4.4 (11%) | | |
| Silane coupling agent 3 | | | | | |
| Comparative silane coupling agent 3 | | | | 8.8 (11%) | |
| Comparative silane coupling agent 4 | | | | | 8.8 (11%) |
| Stearic acid | 2.5 | 2.5 | 2.5 | 2.5 | 2.5 |
| Zinc oxide | 2.5 | 2.5 | 2.5 | 2.5 | 2.5 |
| Antiaging agent | 2 | 2 | 2 | 2 | 2 |
| Terpene resin | | | | | |
| Process oil | 10 | 10 | 10 | 10 | 10 |
| Vulcanization accelerator 1 (CZ) | 2 | 2 | 2 | 2 | 2 |
| Vulcanization accelerator 2 (TBzTD) | | 0.2 | 0.2 | 0.3 | 0.3 |
| Vulcanization accelerator 3 (DPG) | 1 | 1 | 1 | | |
| Sulfur | 2 | 2 | 2 | 2 | 2 |
| Wet performance | 107 | 113 | 80 | 99 | 98 |
| Wear resistance | 105 | 104 | 106 | 105 | 110 |
| Mooney scorch | 104 | 90 | 103 | 92 | 96 |
| T95 | 110 | 76 | 91 | 81 | 62 |

| | Working Example | | | | | | |
|---|---|---|---|---|---|---|---|
| | 1 | 2 | 3 | 4 | 5 | 6 | 7 |
| SBR (E581) (numbers in parentheses to the right indicate the rubber content) | 96.3 (70) | 96.3 (70) | 96.3 (70) | 96.3 (70) | 96.3 (70) | 96.3 (70) | 96.3 (70) |
| BR | 30 | 30 | 30 | 30 | 30 | 30 | 30 |
| Silica | 80 | 80 | 80 | 80 | 80 | 80 | 80 |
| Carbon black | 10 | 10 | 10 | 10 | 10 | 10 | 10 |
| Comparative silane coupling agent 1 | | | | | | | |
| Comparative silane coupling agent 2 | | | | | | | |
| Silane coupling agent 1 | 8.8 (11%) | 8.8 (11%) | | | | 12.8 (16%) | |
| Silane coupling agent 2 | | | 8.8 (11%) | 8.8 (11%) | 7.2 (9%) | | 8.8 (11%) |
| Silane coupling agent 3 | | | | | 1.6 (2%) | | |
| Comparative silane coupling agent 3 | | | | | | | |

TABLE 1-continued

| | | | | | | | |
|---|---|---|---|---|---|---|---|
| Comparative silane coupling agent 4 | | | | | | | |
| Stearic acid | 2.5 | 2.5 | 2.5 | 2.5 | 2.5 | 2.5 | 2.5 |
| Zinc oxide | 2.5 | 2.5 | 2.5 | 2.5 | 2.5 | 2.5 | 2.5 |
| Antiaging agent | 2 | 2 | 2 | 2 | 2 | 2 | 2 |
| Terpene resin | | | | | | | 5 |
| Process oil | 10 | 10 | 10 | 10 | 10 | 10 | 5 |
| Vulcanization accelerator 1 (CZ) | 2 | 2 | 2 | 2 | 2 | 2 | 2 |
| Vulcanization accelerator 2 (TBzTD) | 0.3 | 0.2 | 0.3 | 0.2 | 0.2 | 0.2 | 0.2 |
| Vulcanization accelerator 3 (DPG) | | 1 | | 1 | 1 | 1 | 1 |
| Sulfur | 2 | 2 | 2 | 2 | 2 | 2 | 2 |
| Wet performance | 107 | 110 | 109 | 112 | 110 | 114 | 118 |
| Wear resistance | 106 | 109 | 109 | 112 | 109 | 113 | 111 |
| Mooney scorch | 110 | 104 | 107 | 102 | 104 | 100 | 103 |
| T95 | 98 | 94 | 96 | 92 | 96 | 88 | 94 |

Details of the components described in Table 1 are as follows.

SBR (E581): Styrene-butadiene rubber, E581 (oil extending quantity per 100 parts by mass of the rubber component: 37.5 parts by mass (rubber content per 96.3 parts by mass: 70 parts by mass), weight average molecular weight: 1,200,000, styrene content: 37 mass %, vinyl bond content: 43%, manufactured by Asahi Kasei Corporation)

BR: Butadiene rubber: Nippol BR 1220 (manufactured by the Zeon Corporation)

Silica: Zeosil 1165 MP manufactured by Rhodia Corporation; silica having a nitrogen adsorption specific surface area of 160 $m^2/g$, a CTAB specific surface area of 159 $m^2/g$, a DBP absorption number of 200 mL/100 g, and $N_2SA$/CTAB of 1.0

Carbon black: Show Black N339 (CTAB adsorption specific surface area=90 $m^2/g$, manufactured by Cabot Japan)

Comparative silane coupling agent 1: Si363 (manufactured by Evonik Degussa Corp.); $[C_{13}H_{27}O-(CH_2CH_2O)_5]_2(CH_2CH_2O)Si(CH_2)_2SH$ Comparative silane coupling agent 2: 3-mercaptopropyl-trimethoxysilane (KBM-803, manufactured by Shin-Etsu Chemical Co., Ltd.)

Silane coupling agent 1: polysiloxane 1 produced as described above

Silane coupling agent 2: polysiloxane 2 produced as described above

Silane coupling agent 3: Si69 (manufactured by Evonik Degussa Corp.)

Comparative silane coupling agent 3: comparative polysiloxane 1 synthesized as described above Comparative silane coupling agent 4: comparative polysiloxane 4 synthesized as described above Stearic acid: stearic acid beads (manufactured by Nippon Oil & Fats Co., Ltd.)

Zinc oxide: Type 3 zinc flower (manufactured by Seido Chemical Industry Ltd.)

Antiaging agent: N-phenyl-N'-(1,3-dimethylbutyl)-p-phenylenediamine (Santoflex 6PPD, manufactured by Flexsys)

Terpene resin: Styrene modified terpene resin; YS Resin TO125 (manufactured by Yasuhara Chemical Co., Ltd., softening point: 125° C.)

Process oil: Extract No. 4 S (manufactured by Showa Shell Seikyu K.K.)

Vulcanization accelerator 1 (CZ): N-cyclohexyl-2-benzothiazolyl sulfenamide (NOCCELER CZ-G, manufactured by Ouchi Shinko Chemical Industrial Co., Ltd.)

Vulcanization accelerator 2 (TBzTD): Tetrabenzylthiuram disulfide, manufactured by Flexsys Inc.

Vulcanization accelerator 3 (DPG): 1,3-diphenylguanidine (Soxinol D-G, manufactured by Sumitomo Chemical Co., Ltd.)

Sulfur: "Golden Flower" oil-treated sulfur powder (manufactured by Tsurumi Chemical Industry Co., Ltd.)

As is clear from the results shown in Table 1, Comparative Examples 1 to 4, which contain comparative silane coupling agents 1 and 2, have a shorter Mooney scorch time and worse processability than the reference example. Comparative Example 5, which does not contain a thiuram disulfide vulcanization accelerator, has a slower vulcanization rate ($t_{95}$) and worse productivity than the reference example. Comparative Example 6, which contains a guanidine vulcanization accelerator but does not contain a thiuram disulfide vulcanization accelerator, does not have a good balance of Mooney scorch time and vulcanization acceleration because $t_{95}$ is slow relative to Mooney scorch time. Comparative Example 7, in which the amount of sulfur-containing silane coupling agent represented by the average composition formula of Formula (1) exceeds 20 mass % of the amount of silica, has shorter Mooney scorch time and worse processability than the reference example. Comparative Example 8, in which the amount of silica is less than 60 parts by mass per 100 parts by mass of the diene rubber, has poor wet performance. Although Comparative Examples 1 to 7 have better wear resistance than the reference example, their performance does not satisfy current performance requirements.

In contrast, Working Examples 1 to 7 have excellent wet performance and wear resistance as well as excellent processability. In short, the rubber composition for a tire of the present technology has an excellent balance of wet performance, wear resistance, and processability.

When the rubber composition for a tire of the present technology further comprises a terpene resin, wet performance is superior.

When the rubber composition for a tire of the present technology further comprises a guanidine vulcanization accelerator, the vulcanization rate during vulcanization is faster and wear resistance and wet performance are superior because of the guanidine vulcanization accelerator.

As described above, when Comparative Examples 5 and 6 are compared with the reference example, when a thiuram disulfide vulcanization accelerator is not contained, even if the conventional mercaptosilane coupling agent is simply replaced with the sulfur-containing silane coupling agent used in the present technology, the vulcanization rate $t_{95}$ during vulcanization is slower than that of the reference example, and as a result, productivity is worse and there is not a balance of Mooney scorch time and vulcanization acceleration, as in Comparative Examples 5 and 6.

Furthermore, when Comparative Examples 1 to 4 are compared with Working Examples 1 to 7, since all of Comparative Examples 1 to 4 and Working Examples 1 to 7 contain a thiuram disulfide vulcanization accelerator, $t_{95}$ is faster than the reference example, productivity is good, the balance of Mooney scorch time and vulcanization acceleration is excellent, and processability is excellent.

However, in this case, the Mooney scorch time of Working Examples 1 to 7 is equal to or longer than that of the reference example, and that of Comparative Examples 1 to 4 is shorter than that of the reference example. In short, Working Examples 1 to 7 behave in the opposite manner as Comparative Examples 1 to 4 with regard to Mooney scorch time.

In this manner, combined use of the sulfur-containing silane coupling agent represented by the average composition formula of Formula (1) and the thiuram disulfide vulcanization accelerator represented by Formula (I) in a rubber composition containing silane results in a faster vulcanization rate $t_{95}$ during vulcanization and a higher crosslink density in a shorter vulcanization time than combined use of a conventional sulfur-containing silane coupling agent and thiuram disulfide vulcanization accelerator, and results in long Mooney scorch time and excellent process stability, and thus excellent processability.

Thus, the rubber composition for a tire of the present technology has a fast vulcanization rate $t_{95}$ during vulcanization and can achieve a higher crosslink density in a shorter vulcanization time, and has a long Mooney scorch time and excellent process stability, and thus excellent processability.

The present inventors believe that the rubber composition for a tire according to the present technology achieves the effects described above as follows.

They believe that because a mercaptosilane like the conventional silane coupling agent 1 has a group such as $[C_{13}H_{27}O—(CH_2CH_2O)_5]$, steric hindrance in the vicinity of the mercapto group is greater than in comparative silane coupling agent 2, and as a result, the above such group functions as a protecting group of the mercapto group. However, as is clear from the results of Comparative Examples 1 to 4, scorch is accelerated because the mercapto group-protecting effect of the conventional mercaptosilane is lower than the accelerating capacity of the thiuram disulfide vulcanization accelerator.

In contrast, the skeleton of the sulfur-containing silane coupling agent represented by the average composition formula of Formula (1) contained in the rubber composition for a tire of the present technology is a siloxane structure. In addition, when the sulfur-containing silane coupling agent has a monovalent hydrocarbon group having from 5 to 10 carbon atoms represented by B, B may function as an effective protecting group of the mercapto group. Therefore, the vicinity of the mercapto group of the sulfur-containing silane coupling agent is thought to be even bulkier than a conventional mercaptosilane due to the siloxane structure of the skeleton, and also due to the presence of B when the agent contains B. Due to this bulky structure, the Mooney scorch time of the rubber composition for a tire according to the present technology is short, and processing stability is assured. However, it can be said that such a bulky structure does not inhibit the vulcanization rate during vulcanization.

In addition, the sulfur-containing silane coupling agent may have better affinity and reactivity with silica than conventional mercaptosilanes since it has a hydrolyzable group represented by C, a siloxane structure, and an appropriate molecular weight. It is thought that the rubber composition for a tire according to the present technology achieves excellent wet performance and wear resistance due to this fact.

The above mechanism is an inference by the inventors of the present application, but if the mechanism is a mechanism other than that described above, it is still within the scope of the present technology.

What is claimed is:

1. A rubber composition for a tire, comprising:
   silica contained in a quantity from 60 to 200 parts by mass per 100 parts by mass of diene rubber;
   a polysiloxane represented by Formula (1) as a sulfur-containing silane coupling agent, contained in a quantity from 1 to 20 mass % relative to the content of silica; and
   a thiuram disulfide vulcanization accelerator represented by Formula (I), contained in a quantity from 0.05 to 3.0 parts by mass;

Formula (1) is an average composition formula, and in Formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \leq a < 1$, $0 \leq b < 1$, $0 < c < 3$, $0 < d < 1$, $0 \leq e < 2$, and $0 < 2a+b+c+d+e < 4$; however, one of either a or b is not 0;

Formula I

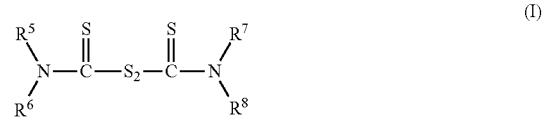

in Formula (I), $R^5$, $R^6$, $R^7$, and $R^8$ are, each independently, a hydrocarbon group having from 2 to 18 carbon atoms.

2. The rubber composition for a tire according to claim 1, further comprising from 0.1 to 3.0 parts by mass of guanidine vulcanization accelerator per 100 parts by mass of the diene rubber, the amount of the thiuram disulfide vulcanization accelerator being from 0.05 to 2.0 parts by mass per 100 parts by mass of the diene rubber.

3. The rubber composition for a tire according to claim 1, further comprising a terpene resin.

4. The rubber composition for a tire according to claim 3, wherein the amount of the terpene resin is from 1 to 30 parts by mass per 100 parts by mass of the diene rubber, and the terpene resin is an aromatic modified terpene resin having a softening point from 60 to 150° C.

5. The rubber composition for a tire according to claim 1, wherein b in Formula (1) is greater than 0.

6. A pneumatic tire having tire treads formed using the rubber composition for a tire described in claim 1.

7. The rubber composition for a tire according to claim 2, further comprising a terpene resin.

8. The rubber composition for a tire according to claim 7, wherein the amount of the terpene resin is from 1 to 30 parts by mass per 100 parts by mass of the diene rubber, and the terpene resin is an aromatic modified terpene resin having a softening point from 60 to 150° C.

9. The rubber composition for a tire according to claim 2, wherein b in Formula (1) is greater than 0.

* * * * *